United States Patent
Shirasawa (10) Patent No.: US 6,839,460 B2
(45) Date of Patent: Jan. 4, 2005

(54) IMAGE PROCESSING METHOD, IMAGE PROCESSING APPARATUS AND RECORDING MEDIUM

(75) Inventor: Hisao Shirasawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 764 days.

(21) Appl. No.: 09/873,993

(22) Filed: Jun. 6, 2001

(65) Prior Publication Data

US 2001/0052990 A1 Dec. 20, 2001

(30) Foreign Application Priority Data

Jun. 9, 2000 (JP) ........................................ 2000-179390

(51) Int. Cl.⁷ ................................................ G06K 9/00
(52) U.S. Cl. ...................................... 382/167; 382/169
(58) Field of Search ................................ 382/162–170; 358/518–540

(56) References Cited

U.S. PATENT DOCUMENTS

| | | | | |
|---|---|---|---|---|
| 5,046,118 A | * | 9/1991 | Ajewole et al. | 382/169 |
| 5,268,967 A | * | 12/1993 | Jang et al. | 382/132 |
| 5,822,453 A | * | 10/1998 | Lee et al. | 382/169 |
| 5,892,840 A | * | 4/1999 | Jang et al. | 382/132 |
| 5,930,009 A | * | 7/1999 | Sato et al. | 358/518 |
| 6,097,470 A | * | 8/2000 | Buhr et al. | 355/38 |
| 6,137,595 A | | 10/2000 | Sakuyama et al. | |
| 6,226,011 B1 | | 5/2001 | Sakuyama et al. | |
| 6,628,830 B1 | * | 9/2003 | Yamazoe et al. | 382/168 |

FOREIGN PATENT DOCUMENTS

JP 10-208034 8/1998

* cited by examiner

*Primary Examiner*—Jingge Wu
(74) *Attorney, Agent, or Firm*—Oblon, Spivak, McClelland, Maier & Neustadt, P.C.

(57) ABSTRACT

When performing predetermined color correction/modification processing on RGB image data including red, green and blue color components so as to perform hue correction thereon, a frequency distribution of respective tone values is obtained for at least one of these red, green and blue color components of the RGB image data; it is determined from the frequency distribution whether or not the RGB image data has already undergone tone transformation; and the predetermined color correction/modification processing is performed on the RGB image data so as to perform the hue correction thereon only when it is determined that the RGB image data has not undergone tone transformation yet.

9 Claims, 6 Drawing Sheets

IMAGE PROCESSING METHOD, IMAGE PROCESSING APPARATUS AND RECORDING MEDIUM

BACKGROUND OF THE INVENTION

1. Field of the Invention

The present invention generally relates to an image processing method, an image processing device and a recording medium, and, in particular, to an image processing method, an image processing device and a recording medium, usable in a driver software, an image editing software, and so forth, of a color printer, and so forth.

2. Description of the Related Art

Recently, in many cases, image data taken through a digital still camera (digital camera) is used after being input to a work station, a personal computer or the like. For the image data thus input to such a device, a user may wish to make desired modification thereto by utilizing characteristics of such a digital image when a thus-taken image is taken in an exposure unsatisfactory condition, a taken-into-sun condition, or the like. In a case of such a digital image as that taken through a digital camera, in contrast to a case of a picture taken by a conventional silver bromide type camera, high-grade hue correction can be performed thereon by using image correcting/modifying software.

There are various types of image correcting/modifying software used for correcting/modifying such digital image data. By starting up such software in a computer, a user can perform various correction/modification operations on digital image data. For example, it is possible to enhance a contrast of the image by increasing the brightness thereof.

Further, there are many methods of automatic hue correction operation proposed. For example, Japanese Laid-Open Patent Application No. 10-208034 discloses a process of changing a correspondence relationship between an original brightness distribution and an after-transformed brightness distribution, from a direct proportional one into an S-shape distorted one, and performing automatic contrast correction.

Further, the above-mentioned Japanese Laid-Open Patent Application No. 10-208034 also discloses an art in which, by installing automatic image correction processing software into a printer driver software or into a printer body itself, an image taken through a digital camera or a scanner is automatically corrected, and, then, is printed out. Furthermore, in this publication, some other configurations are disclosed. For example, it is determined from a state in brightness distribution of a given image whether or not the image is a two-tone-level image, or a business graph. Then, when in such a case, the above-mentioned automatic contrast correcting operation can be prevented from being performed on the image.

By installing the above-mentioned automatic image correction processing program into a printer driver software or a printer body itself, it is possible that even an image lacking contrast or with an unsatisfactory color balance can be output after the hue thereof being well controlled.

However, by such a method, as the printer itself automatically controls the hue of an image, a problematic result printed out may occur such that the printed out image does not reflect an operation of a user when the user intentionally performs the operation of correction on the same image manually through an image correction/modification software other than the above-mentioned automatic image correction processing program.

SUMMARY OF THE INVENTION

An object of the present invention is to provide an image processing device and an image processing method by which it is possible to obtain a printed out image which properly reflects contents of correction intentionally performed by a user in the above-mentioned case or the like.

An image processing method, according to the present invention, of performing predetermined color correction/modification processing on RGB image data including red, green and blue color components so as to perform hue correction thereon, comprises the steps of:

a) obtaining a frequency distribution of respective tone values (distribution in number of occurrences of the respective tone values in the given image data) for at least one of these red, green and blue color components of the RGB image data;

b) determining from the frequency distribution whether or not the RGB image data has already undergone tone transformation; and c) automatically performing the predetermined color correction/modification processing on the RGB image data so as to perform the hue correction thereon only when it is determined in the step b) that the RGB image data has not undergone tone transformation yet.

Thereby, when an operator intentionally makes a tone transformation (correction) operation on the image data previously, the above-mentioned predetermined color correction/modification processing is not automatically performed on the same image data. Thereby, it is possible to obtain an output image properly reflects the correction operation thus intentionally made by the operator.

The above-mentioned step b) may comprise a step of evaluating as to whether or not the frequency distribution is continuous. Thereby, it is possible to properly determine whether or not the operator previously made the correction operation on the image data intentionally.

The above-mentioned step of evaluating may comprise the step of determining that the frequency distribution is discontinuous when, in the frequency distribution, a frequency $H_v$ of a tone value v is 0, and, also, each of frequencies $H_{v-1}$ and $H_{v+1}$ of adjacent tone values v−1 and v+1 is larger than a predetermined threshold. Thereby, it is possible to determine as to continuity of the frequency distribution easily.

The above-mentioned step of evaluating may includes the step of determining that the frequency distribution is discontinuous when, in the frequency distribution, a difference $|H_v - H_{v-1}|$ or $|H_v - H_{v+1}|$ in frequency between a tone value v and each of adjacent tone values v−1 and v+1 is larger than a predetermined threshold. Thereby, it is possible to determine as to continuity of the frequency distribution easily.

The above-mentioned step of evaluating may be performed only for a range of the minimum tone value through the maximum tone value each having a non-zero frequency in the frequency distribution. Thereby, it is possible to determine as to continuity of the frequency distribution rapidly.

An image processing device, according to the present invention, performing predetermined color correction/modification processing on RGB image data including red, green and blue color components so as to perform hue correction thereon, comprises:

a frequency distribution generating part obtaining a frequency distribution of respective tone values for at least one of these red, green and blue color components of the RGB image data;

a determining part determining from the above-mentioned frequency distribution whether or not the RGB image data has already undergone tone transformation;

a hue correcting part performing the predetermined color correction/modification processing on the RGB image data so as to perform the hue correction thereon; and a switching part selecting, according to a determination result of the above-mentioned determining part, one of the RGB image data not having undergone the hue correction performed by the hue correcting part yet and the same data but already having undergone the hue correction performed by the hue correcting part, to be output.

The above-mentioned switching part may select the RGB image data not having undergone the hue correction performed by the hue correcting part yet to be output when the above-mentioned determining part determines that the RGB image data has already undergone tone transformation, but selects the same data but already having undergone the hue correction performed by the hue correcting part to be output when the determining part determines that the RGB image data has not undergone tone transformation yet.

A computer-readable recording medium, according to the present invention, stores therein a program for causing a computer to perform predetermined color correction/modification processing on RGB image data including red, green and blue color components so as to perform hue correction thereon. The above-mentioned program comprises:

first program code means for obtaining a frequency distribution of respective tone values for at least one of these red, green and blue color components of the RGB image data;

second program code means for determining from the above-mentioned frequency distribution whether or not the RGB image data has already undergone tone transformation; and third program code means for performing the predetermined color correction/modification processing on the RGB image data so as to perform the hue correction thereon only when it is determined, by executing the second program code means, that the RGB image data has not undergone tone transformation yet.

Other objects and further features of the present invention will become more apparent from the following detailed description when read in conjunction with the accompanying drawings.

DETAILED DESCRIPTION OF THE PREFERRED EMBODIMENT

Figure 1:
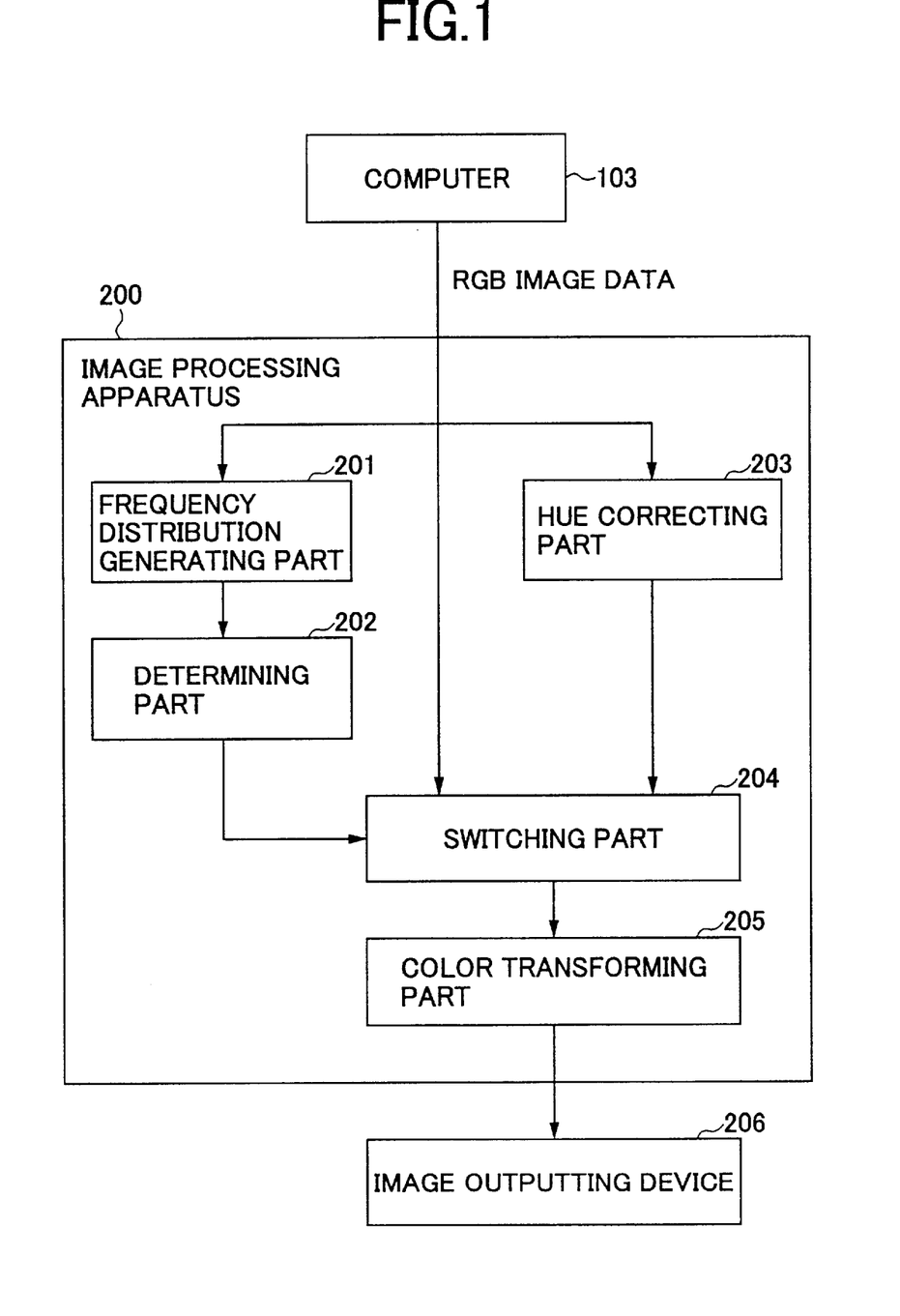
FIG. 1 shows an example of a configuration of an image processing system according to the present invention.

FIG. 1 shows a configuration of an image processing system in one embodiment of the present invention. This system includes a computer 103, an image processing device 200 and an image outputting device 206.

The computer 103 controls the image processing device 200. When outputting instructions are input by an operator to the computer 103, the computer 103 transmits image data obtained as a result of an image being taken through a digital camera or a scanner, or image data having undergone hue correction performed through an image correcting/modifying software in the computer 103, to the image processing device 200.

The image processing device 200 analyzes the image data thus given by the computer 103, performs image processing for performing hue correction described later thereon as it is necessary, and transfers the image data resulting therefrom to the image outputting device 206.

The image outputting device 206 includes a printer, a display device, and so forth, and, prints out and displays therethrough the image data provided by the image processing device 200.

Further, the image processing device 200 includes a frequency distribution generating part 201 which generates a frequency distribution for respective tone values for at least one color component of red, green and blue color components of RGB image data input from the computer 103, a determining part 202 which determines from the frequency distribution thus generated by the frequency distribution generating part 201 whether or not tone transformation has been already performed on the input RGB image data, a hue correcting part 203 which performs hue correction on the input RGB image data by performing a predetermined color correction/modification operation thereon, and a switching part 204 which determines from the result of determination of the determining part 202 whether the input RGB image data is to be output as it is or the RGB image data having undergone the hue correction performed by the hue correcting part 203 is to be output.

The above-mentioned hue correcting part 203 has a function of making the frequency distribution of the input RGB image data be an optimum one. A particular way of the hue correction performed by the hue correcting part 203 is not limited to a specific one, and may be one disclosed in the above-mentioned Japanese Laid-Open Patent Application No. 10-208034, for example, or may employ another method.

The above-mentioned determining part 202 makes the determination by evaluating whether or not the given frequency distribution is continuous. The evaluation as to whether or not the frequency distribution is discontinuous is made as follows. That is, an evaluation that the frequency distribution is not continuous is made when the frequency $H_v$ of a tone value v of the frequency distribution is 0, and, also, each of the frequencies $H_{v-1}$ and $H_{v+1}$ of the adjacent tone values v−1 and v+1 has a value equal to or larger than a predetermined threshold. Alternatively, the evaluation that the frequency distribution is not continuous is made when a different between the frequency $H_v$ of a tone value v and each of the frequencies $H_{v-1}$ and $H_{v+1}$ of the adjacent tone values v−1 and v+1 is obtained, and, each of both differences $|H_v-H_{v-1}|$ and $|H_v-H_{v+1}|$ has a value equal to or larger than a predetermined threshold. Such evaluation as to continuity of frequency distribution is made for a range between the maximum tone value and minimum tone value each having a non-zero frequency in the frequency distribution.

The switching part 204 selects the input RGB image data input thereto directly from the computer 103 to be output when the determining part 202 determines that the input RGB image data has undergone tone transformation processing. On the other hand, the switching part selects the RGB image data having undergone the hue correcting processing performed by the hue correcting part 203 to be output when the determining part 202 determines that the input RGB image data does not have undergone tone transformation processing.

The image processing device 200 further includes a color transforming part 205 which performs color transformation on the RGB data provided by the switching part 204, as shown in FIG. 1. This color transforming part 205 is needed when the image outputting part 206 includes a printer. That is, the color transforming part 205 has a function such that a printed output having colors faithful to those of a displayed output can be obtained from the printer, by performing appropriate color transformation on the RGB image data in consideration of the characteristics of an image display device and those of the printer.

Further, a resolution transforming part which transforms the resolution of the RGB image data so as to make it correspond to each particular type of the image outputting device 206 may be provided in the configuration shown in FIG. 1.

The operation of the image processing device 200 will now be described in detail. The RGB image data input to the image processing device 200 from the computer 103 includes tone data for each of the red (R), green (G) and blue (B) color components, and has a bitmap image format. Typically, the number of tones for each color component is of 8 bits, that is, 256 tones. However, it is also possible to use another number of tones, such as 64, 512 or the like.

The frequency distribution generating part 201 obtains a distribution of frequencies of respective tone values (the number of occurrences of each tone value) for each color component of the input RGB image data. Thus, the frequency distribution generating part 201 obtains the frequency distribution of tone values for red, the frequency distribution of tone values for green and the frequency distribution of tone values for blue. However, it is also possible to obtain the frequency distribution of tone values for only one color component in order to reduce a storage capacity needed for storing the thus-obtained frequency distribution.

Figure 2:
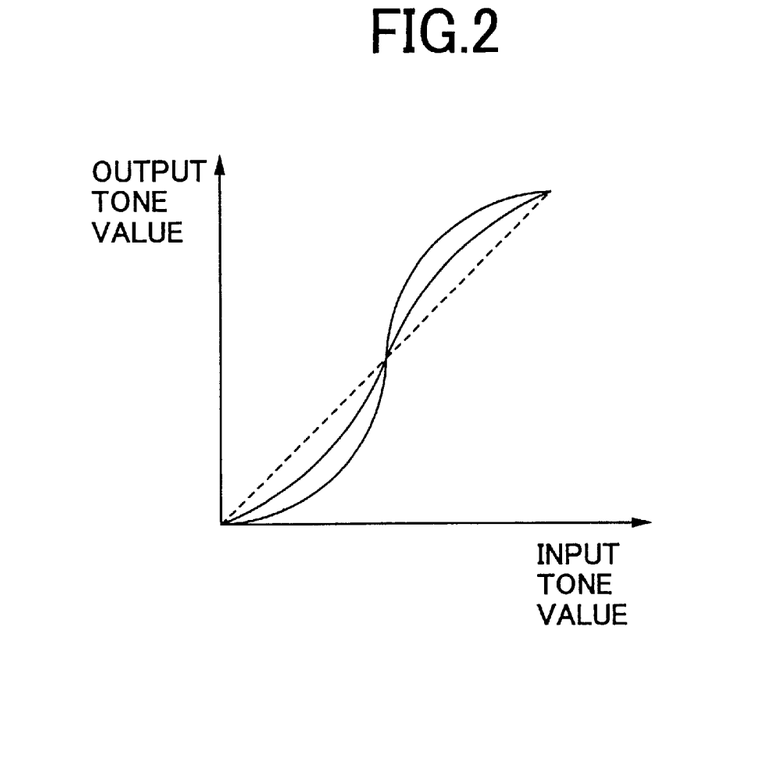
FIG. 2 illustrates S-shaped tone transformation processing (hue correction processing)
Figure 3:
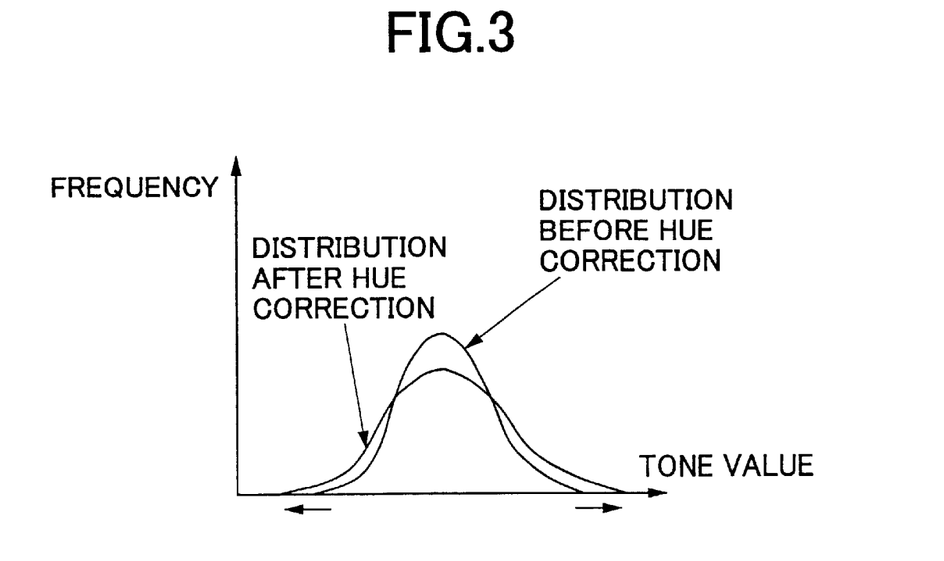
FIG. 3 shows a change in frequency distribution occurring due to the S-shaped tone transformation processing (hue correction processing) shown in FIG. 2 being performed.

The frequency distribution generating part 201 provides the thus-obtained frequency distribution to the determining part 202, which, then, based on the frequency distribution, determines whether or not the RGB data input from the computer 103 is data having undergone tone transformation. A method of this determination will now be described in detail with reference FIGS. 2, 3, 4A and 4B. FIG. 2 shows an example of hue correcting processing, FIG. 3 illustrates variation of frequency distribution, and FIGS. 4A and 4B illustrate continuity/discontinuity of frequency distribution.

An image which is taken through a digital camera while an automatic exposure control mechanism thereof is not operated properly, or improper white balance adjusting operation is performed, for example, may be corrected effectively by automatic image correcting processing. In general, an image correcting method suitable for dealing with such an image is such that a dynamic range thereof is magnified, contrast thereof is changed, a balance among the color components of red, green and blue thereof is adjusted, or the like. Many types of color correcting software present have such functions.

For example, S-shaped tone transformation processing (hue correcting processing) such as that illustrated by FIG. 2 is performed on image data. In this case, for an approximately middle tone level (approximately 128 in tone value), the number of tones, larger than that of the input image data, is allocated (that is, the γ characteristic is larger than 1). As a result, as shown in FIG. 3, the frequency distribution of the middle tone level spreads, and, thereby, the contrast in the output image appears to become improved.

Figure 4A:
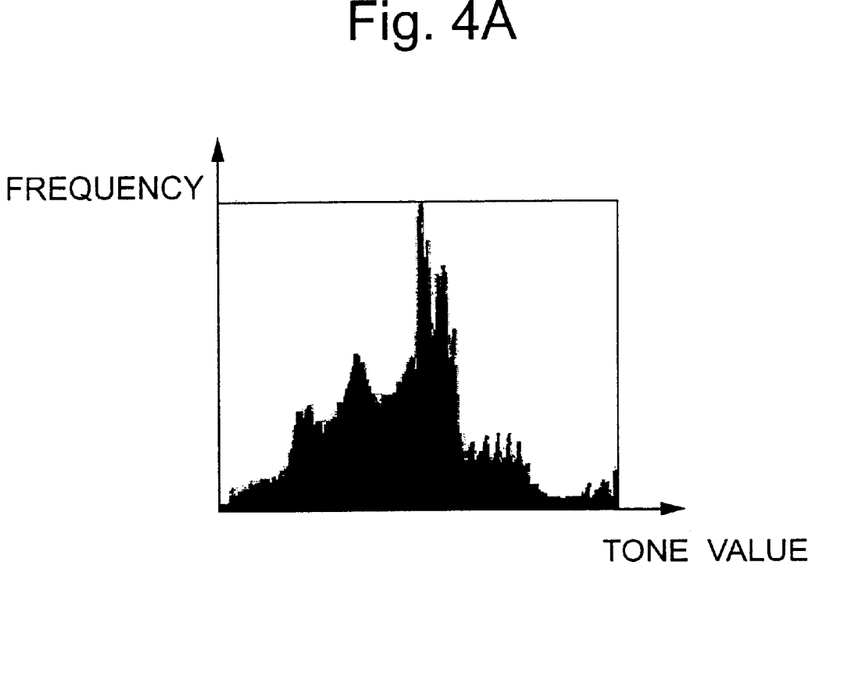
FIG. 4A illustrates a continuous frequency distribution.
Figure 4B:
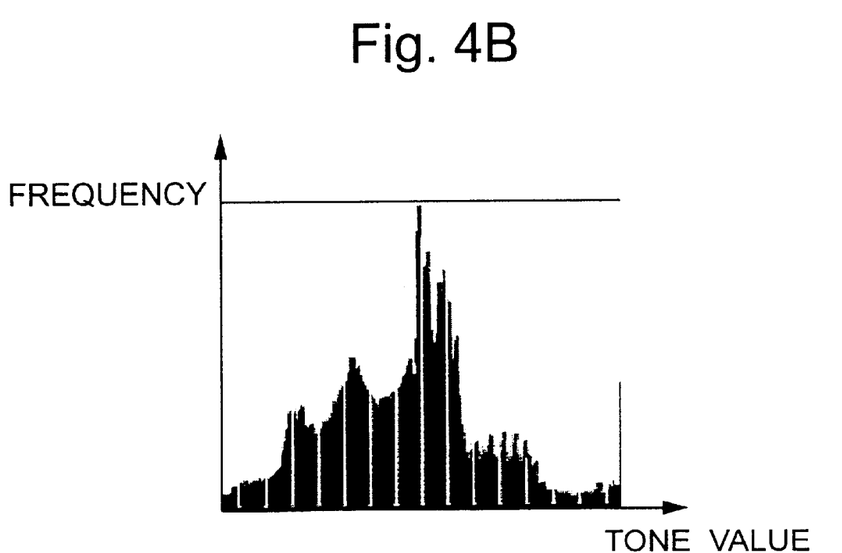
FIG. 4B illustrates a discontinuous frequency distribution.

With reference to FIGS. 4A and 4B, change in frequency distribution results from the above-mentioned tone transformation (hue correction) will now be described in detail. For example, the frequency distribution of an image of scenery taken by a digital camera or the like is continuous with respect to the tone value, as shown in FIG. 4A. However, when the above-mentioned S-shaped tone transformation processing is performed on the image, tone values having the frequencies of zero occur about a middle tone level where the allocated number of tones is increased. As a result, a discontinuous frequency distribution such as that shown in FIG. 4B results. Other than the above-mentioned S-shaped tone transformation processing, similar phenomenon may occur when processing such as to increase the allocated number of tones is performed so that a discontinues frequency distribution results for some tone level range.

As described above, in many cases, when some tone transformation (hue correction) processing is performed on digital image data, the frequency distribution of tone values becomes discontinuous. Accordingly, it is possible to determine whether or not tone transformation has been performed on image data, by evaluating continuity of the frequency distribution.

As mentioned above, the continuity of the frequency distribution of tone values can be evaluated from a determination as to whether or not each of the frequencies of both tone values adjacent to a tone value having the frequency of zero has a sufficiently large value. In order to improve the accuracy of the determination of the continuity of the frequency distribution, a part of detecting a region of the frequency distribution in which the frequency of a tone value is extremely larger than that of an adjacent tone value may be added.

Further, when the frequency distribution of tone values is obtained for each of a plurality of color components of image data, it may be determined that tone transformation has been performed on the image data when the frequency distribution for any color component is determined as discontinuous. Thereby, it is possible to improve the accuracy of the determination.

Thus, it is possible that the determining part 202 determines whether or not the input RGB image data has already undergone tone transformation. When the input RGB image data is determined as having already undergone tone transformation, the switching part 204 provides the input RGB image data directly to the color transforming part 205. The color transforming part 205 performs color transformation processing on the provided image data based on the characteristics of the image display device which the operator uses and those of the printer, such that the colors of the image displayed approximately coincide with those of the image printed. The above-mentioned characteristics of the image display device may be previously recorded in header information of the RGB image data by the computer 103, before the RGB image data is provided to the image processing device 200. Alternatively, it is also possible, when the image processing device 200 is loaded into the computer 103 as described later, a device profile standardized in the ICC (Inter Color Consortium) may be read out so as to obtain the characteristics of the display device to be used for the above-mentioned purpose, for example.

When the determining part 202 determines that the input RGB image data does not have undergone tone transformation yet, the switching part 204 provides the RGB data having undergone hue correction performed by the hue correcting part 203, to the color transforming part 205. However, when the hue correcting part 203 also performs color transformation into data to be printed out, the image data output from the correcting part 203 is directly output to the image outputting device 206, and, thus, the processing performed by the color transforming part 205 is omitted.

Thus, the image processing device 200 does not perform hue correcting processing on the input RGB image data which has already undergone tone transformation. Accordingly, in a case where an operator intentionally performs some tone transformation processing on image data through the computer 103, and, then, the thus-obtained image data is input to the image processing device 200 from the computer 103, the image processing device 200 does not perform hue correction processing on the input image data, and, as a result, the image data output from the image processing device 200 properly reflects the operation thus intentionally performed by the operator.

Figure 5:
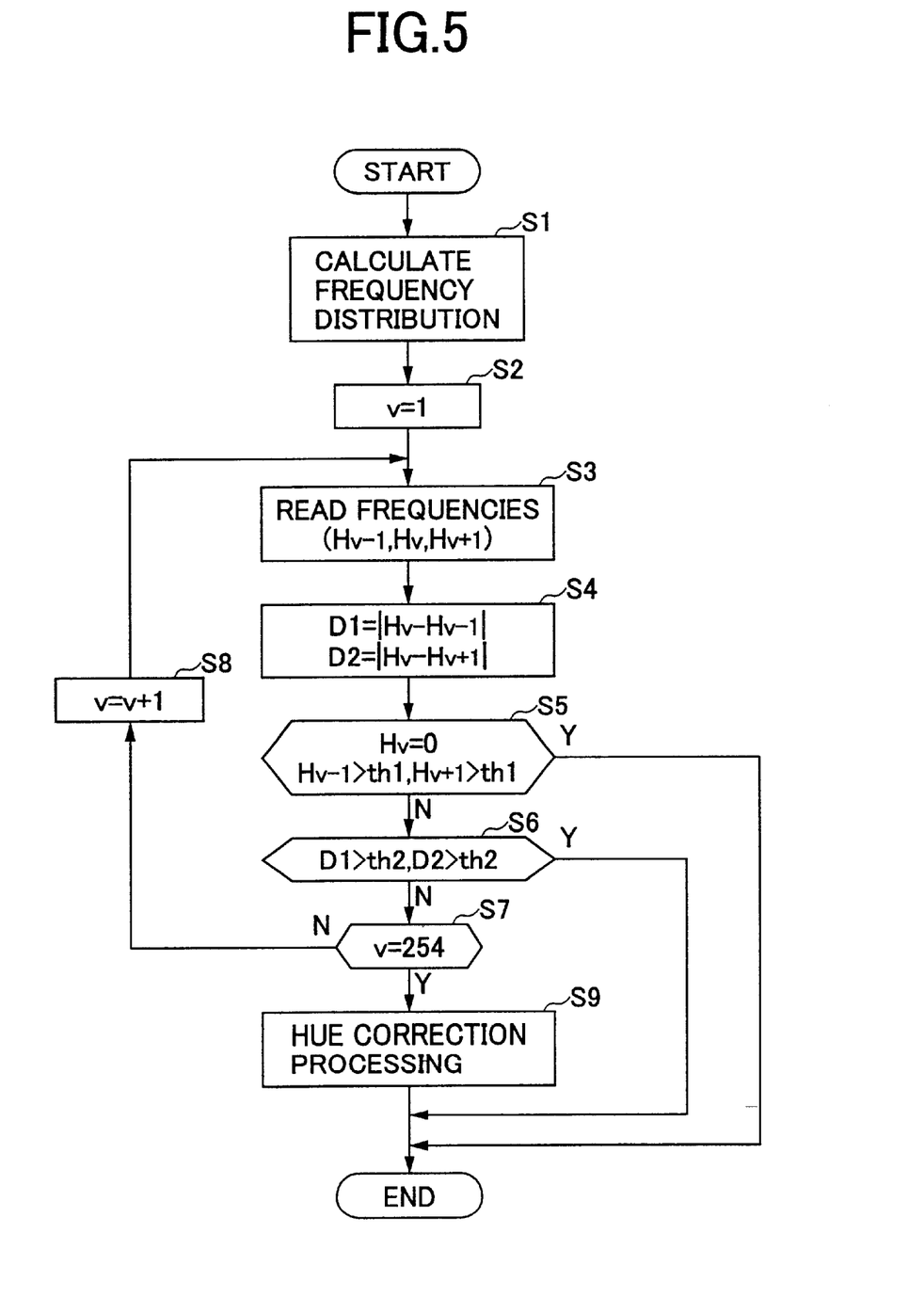
FIG. 5 shows an operation flow chart illustrating an image processing method performed in an image processing device according to the present invention.

FIG. 5 shows a flow chart illustrating the image processing method performed by the image processing device 200 described above. In a step S1 of FIG. 5, the frequency distribution of tone values for each color component is calculated from input RGB image data.

Then, it is determined from respective tone values whether or not the frequency distribution of tone values is continuous. For this purpose, in a step S2, a tone value v is initialized into "1". Then, in a step S3, the frequency $H_v$ of the tone value v and the frequencies $H_{v-1}$ and $H_{v+1}$ of adjacent tone values v−1 and v+1 are read. For example, in a case where the current tone value v is 128, the frequencies (numbers of occurrences, i.e., $H_{v-1}$, $H_v$ and $H_{v+1}$) of the tone values 127, 128 and 129 (v−1, v and v+1) are read, respectively. In a step S4, differences D1 ($=|H_v-H_{v-1}|$) and D2 ($=|H_v-H_{v+1}|$) in frequency between the current tone value and each of the adjacent tone values are calculated.

In a step S5, it is determined whether or not the frequency $H_v$ of the current tone value v is 0 ($H_v=0$), and, also, each of the frequencies $H_{v-1}$ and $H_{v+1}$ of the adjacent tone values v−1 and v+1 is larger than a predetermined threshold th1 ($H_{v-1}>$th1, $H_{v+1}>$th1).

When it is determined that the frequency $H_v$ of the current tone value v is 0 ($H_v=0$), and, also, each of the frequencies $H_{v-1}$ and $H_{v+1}$ of the adjacent tone values v−1 and v+1 is larger than a predetermined threshold th1 ($H_{v-1}>$th1, $H_{v+1}>$th1), it is determined that the frequency distribution of tone values is discontinuous, and, as a result, tone transformation (hue correction) processing is not performed on the input RGB image data.

However, when the requirements that the frequency $H_v$ of the current tone value v is 0 ($H_v=0$), and, also, each of the frequencies $H_{v-1}$ and $H_{v+1}$ of the adjacent tone values v−1 and v+1 is larger than the predetermined threshold th1 ($H_{v-1}>$th1, $H_{v+1}>$th1) are not satisfied, a step S6 is executed. In the step S6, it is determined whether or not each of the differences D1 ($=|H_v-H_{v-1}|$) and D2 ($=|H_v-H_{v+1}|$) in frequency between the current tone value and each of the adjacent tone values is larger than a predetermined threshold th2 (D1>th2, D2>th2).

When each of both differences D1 ($=|H_v-H_{v-1}|$) and D2 ($=|H_v-H_{v+1}|$) in frequency between the current tone value and each of the adjacent tone values is larger than the predetermined threshold th2 (D1>th2, D2>th2), it is determined that the frequency distribution of tone values is discontinuous, and, as a result, tone transformation (hue correction) processing is not performed on the input RGB data.

However, also the requirements that each of both differences D1 ($=|H_v-H_{v-1}|$) and D2 ($=|H_v-H_{v+1}|$) in frequency between the current tone value and each of the adjacent tone values is larger than the predetermined threshold th2 (D1>th2, D2>th2) are not satisfied in the step S6, it is determined that the frequency distribution is not discontinuous for the current tone value v, and a step S7 is executed.

In the step S7, it is determined whether or not the current tone value v becomes "254". When the current tone value does not become "254", the current tone value v is incremented by "1" (v=v+1), the current operation is returned to the step S3, and the process starting from the step S3 is repeated.

Thus, the current tone value v is incremented one by one, and the process of the steps S3 through S8 is repeated. Then, neither the requirements of the step S5 nor the requirements of the step S6 are satisfied until the current tone value v becomes "254", the tone transformation (hue correction) processing is performed on the RGB image data in a step S9.

With regard to the above-mentioned process of the step S5, if the frequency of the tone value of 128 is 0, and each of the frequencies of the tone values of 127 and 129 is sufficiently large, for example, it can be obviously determined that some digital tone transformation processing has been already performed on the image data. Thereby, in such a case, it is determined in the step S5 that the relevant RGB image data has a discontinuous frequency distribution of tone values, and, as a result, the tone transformation (hue correction) processing is skipped over, and the current operation is finished.

On the other hand, in the above-mentioned process of the step S6, discontinuity of the frequency distribution of tone values is determined by detecting a tone value having an extremely large frequency. For example, through the above-mentioned S-shaped tone transformation, the allocated number of tones (tone values) is reduced for each of both a highlight region and a dark region. In a case where the allocated number of tone values is thus reduced, the frequencies of tone values are added together there. Accordingly, some tone values have extremely larger frequencies than those of the adjacent tone values. Therefore, when each of both differences D1 and D2 in frequency between adjacent tone values is larger than the predetermined threshold th2 in the step S6, it can be determined that transformation processing such that the allocated number of tones is reduced has been performed, and thus, the hue correction processing (in the step S9) is skipped over, and, the current operation is finished.

Further, in the example of operation shown in FIG. 5, all the tone values are examined. However, it is also possible to simply this. For example, when the frequency distribution of tone values is produced in the step S1, the maximum tone value and minimum tone value of the image data of the frequency distribution are obtained. Then, the examination is made only within the range therebetween. Thereby, it is possible to achieve a high-speed determination operation.

Thereby, when an operator make a hue correction on image data intentionally, it is possible to obtain a printed out image having colors corresponding to those of the same image displayed on the image display device. Also, when an operator does not make any hue correction on image data, it is possible to obtain a printed out image which is sharp as a result of hue correction (in the step S9) being performed such that contrast, color balance and so forth thereof are optimized.

Figure 6:
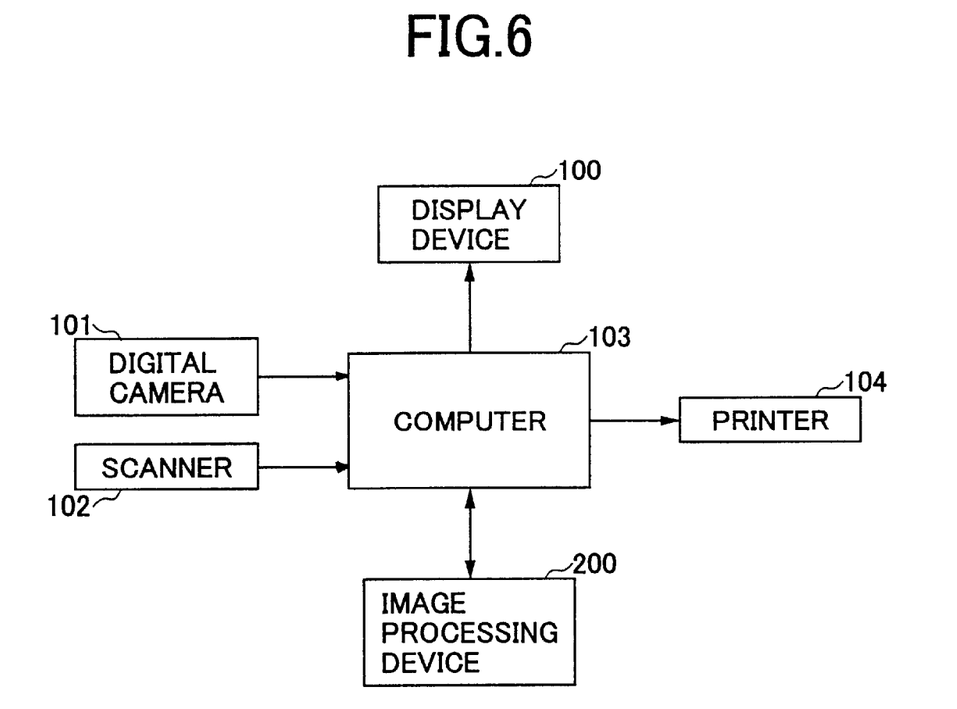
FIG. 6 shows a specific example of system configuration embodying the present invention.

FIG. 6 shows a specific example of system configuration embodying the above-described image processing method by employing the image processing device 200 in the embodiment of the present invention. In FIG. 6, a computer 103 has various software programs such as color correction/modification applications, printer driver, and so forth installed therein. Image data to be processed is input to the computer 103 through a digital camera 101 or a scanner 102. Image data processed by the computer 103 is displayed on a display device 100, and is printed out through a printer 104. The printer 104 may be a color printer, a color copier, a color facsimile machine, or the like.

The image processing device 200 shown in FIG. 6 may be built in the printer 104, and automatically correct hue of given image data. Alternatively, the image processing device 200 may be built in the computer 103. Further alternatively, it is also possible that a printer control device is provided separately/independently from the printer 104, and has the image processing device 100 built therein. In this case, image data undergoes hue correction performed by the image processing device 200 automatically, and, then, is sent to the printer 104.

Furthermore, it is also possible to embody the present invention by a software program. In this case, the present invention is embodied by a printer driver installed in a computer as a software program.

Figure 7:
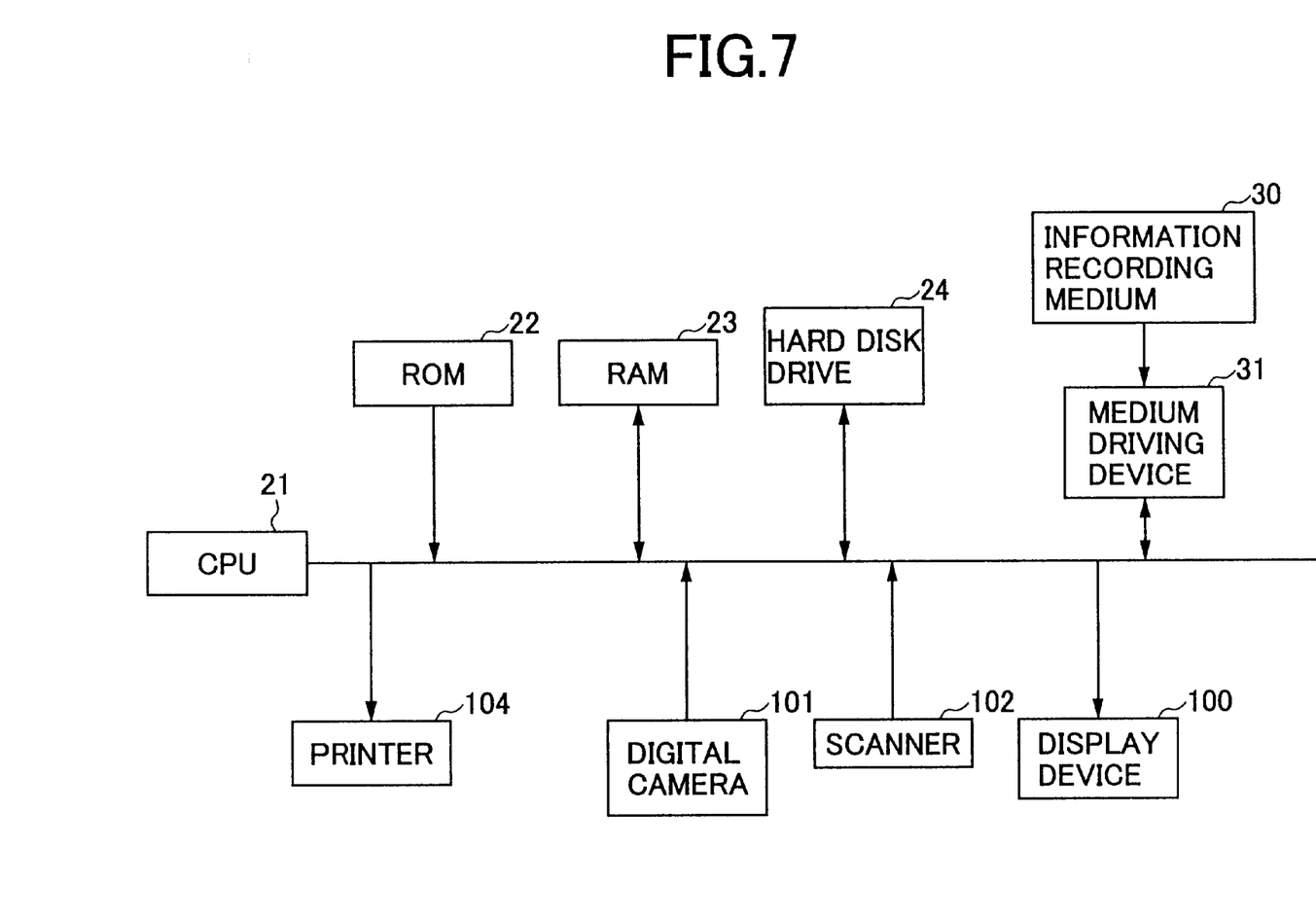
FIG. 7 shows an example of hardware configuration of the image processing system shown in FIGS. 1 and 6.

FIG. 7 shows an internal hardware configuration of the computer 103 in the system shown in FIGS. 1 and 6. However, in the configuration shown in FIG. 7, a CPU 21 and so forth act as the image processing device 200 shown in FIGS. 1 and 6. With reference to FIG. 7, this image processing system can be embodied by a work station, a personal computer or the like, includes the CPU 21 controlling the entirety of the system, a ROM 22 storing therein a control program for the CPU 21 and so forth, a RAM 23 used as a work area of the CPU 21, a hard disk drive 24, a digital camera 101 and a scanner 102 for inputting RGB image data to the system, a display device 100 displaying image data, and a printer 104 such as a color printer.

The CPU 21, ROM 22, RAM 23 and hard disk drive 24 act as the computer 103 shown in FIGS. 1 and 6. As mentioned above, the CPU 21 and so forth may act as the image processing device 200 shown in FIGS. 1 and 6.

Specifically, the image processing function for acting as the image processing device 200 may be provided as a form of a software package (specifically, an information recording medium 30, shown in FIG. 7, such as a CD-ROM or the like), for example. In FIG. 7, the information recording medium 30 is set in and is driven by a medium driving device 31 such as a CD-ROM drive.

In other words, an image processing device and an image processing method according to the present invention can be embodied by a system configuration such that a program previously recorded in an information recording medium such as a CD-ROM or the like is read by a general-purpose computer provided with an image scanner, a display device and so forth, and a microprocessor of this computer executes instructions of this program so as to perform image processing according to the present invention. In this case, the program (used by the above-mentioned hardware system) for executing the image processing according to the present invention (such that, when predetermined color correction/modification processing is performed on input RGB image data including red, green and blue color components so that hue correction is to be performed thereon, a frequency distribution of respective tone values for at least one of these red, green and blue color components of the input RGB image data is obtained, it is determined from the thus-obtained frequency distribution whether or not the RGB image data has already undergone tone transformation, and the predetermined color correction/modification processing is performed on the RGB image data so that the hue correction is to be performed thereon only when it is determined that the RGB image data has not undergone tone transformation yet) is provided in a state in which it is recorded in the information recording medium. As the information recording medium in which the program and so forth are recorded, not only a CD-ROM, but also a ROM, a RAM, a flexible disk, a memory card and so forth may be used. The program recorded in the information recording medium is installed into a recording device incorporated into the hardware system such as the hard disk drive 24, for example, and, thereby, by using the program, the image processing function according to the present invention is rendered by this system.

Such a (software) program for embodying an image processing device and an image processing method according to the present invention may be provided not only in a form of an information recording medium but also in a form such that it is provided via communication (from a server via the Internet, for example).

The present invention is not limited to the above-described embodiments, and variations and modifications may be made without departing from the scope of the present invention.

The present application is based on Japanese priority application No. 2000-179390, filed on Jun. 9, 2000, the entire contents of which are hereby incorporated by reference.

What is claimed is:

1. An image processing method of performing predetermined color correction/modification processing on image data comprising a plurality of color components so as to perform hue correction thereon, comprising the steps of:

a) obtaining a frequency distribution of respective tone values for at least one of the plurality of color components of the image data;

b) determining from the thus-obtained frequency distribution whether or not the image data has already undergone tone transformation; and c) performing the predetermined color correction/modification processing on the image data so as to perform the hue correction thereon only when it is determined in said step b) that the image data has not undergone tone transformation yet.

2. The method as claimed in claim 1, wherein said step b) comprises a step of evaluating as to whether or not the frequency distribution of tone values is continuous.

3. The method as claimed in claim 2, wherein said step of evaluating determines that the frequency distribution of tone values is discontinuous when a frequency of a tone value is 0, and, also, each of frequencies of adjacent tone values is larger than a predetermined threshold.

4. The method as claimed in claim 2, wherein said step of evaluating determines that the frequency distribution of tone values is discontinuous when a difference in frequency between a tone value and each of adjacent tone values is larger than a predetermined threshold.

5. The method as claimed in claim 2, wherein said step of evaluating is performed for a range between the maximum tone value and the minimum tone value each having a non-zero frequency.

6. An image processing device performing predetermined color correction/modification processing on image data comprising a plurality of color components so as to perform hue correction thereon, comprising:

a frequency distribution generating part obtaining a frequency distribution of respective tone values for at least one of the plurality of color components of the image data;

a determining part determining from the thus-obtained frequency distribution whether or not the image data has already undergone tone transformation;

a hue correcting part performing the predetermined color correction/modification processing on the image data so as to perform the hue correction thereon; and a switching part selecting, according to a determination result of said determining part, one of the image data not having undergone the hue correction performed by said hue correcting part and the same image data but having already undergone the hue correction performed by said hue correcting part, to be output.

7. The device as claimed in claim 6, wherein said switching part selects the image data not having undergone the hue correction performed by said hue correcting part yet, to be output, when said determining part determines that the image data has already undergone tone transformation, but selects the same image data but having already undergone the hue correction performed by said hue correcting part, to be output, when said determining part determines that the image data has not undergone tone transformation yet.

8. A computer-readable recording medium storing therein a program for causing a computer to perform predetermined color correction/modification processing on image data comprising a plurality of color components so as to perform hue correction thereon, said program comprising:

first program code means for obtaining a frequency distribution of respective tone values for at least one of the plurality of color components of the image data;

second program code means for determining from the thus-obtained frequency distribution whether or not the image data has already undergone tone transformation; and third program code means for performing the predetermined color correction/modification processing on the image data so as to perform the hue correction thereon only when it is determined by executing said second program code means that the image data has not undergone tone transformation yet.

9. A program for causing a computer to perform predetermined color correction/modification processing on image data comprising a plurality of color components so as to perform hue correction thereon, comprising:

first program code means for obtaining a frequency distribution of respective tone values for at least one of the plurality of color components of the image data;

second program code means for determining from the thus-obtained frequency distribution whether or not the image data has already undergone tone transformation; and third program code means for performing the predetermined color correction/modification processing on the image data so as to perform the hue correction thereon only when it is determined by executing said second program code means that the image data has not undergone tone transformation yet.

* * * * *